July 12, 1932.  F. R. MAIER  1,866,859
BOOT TREE
Filed Aug. 15, 1930  2 Sheets-Sheet 1

INVENTOR.
Fred R. Maier
BY
ATTORNEY.

July 12, 1932.  F. R. MAIER  1,866,859
BOOT TREE
Filed Aug. 15, 1930  2 Sheets-Sheet 2

INVENTOR.
Fred R. Maier
BY
ATTORNEY.

Patented July 12, 1932

1,866,859

UNITED STATES PATENT OFFICE

FRED R. MAIER, OF KANSAS CITY, MISSOURI

BOOT TREE

Application filed August 15, 1930. Serial No. 475,421.

My invention relates to boot trees and more particularly to trees having adjustable sections, the principal objects of the invention being to provide resilient means for expanding tree sections, and to effect automatic adjustment of the lower portions of boot tree sections to a boot when the tree is mounted in the same.

In accomplishing these and other objects of my invention, I have provided improved details of structure, the preferred form of which is illustrated in the accompanying drawings, wherein:

Fig. 4 is a perspective view from the rear of the front section of the tree.

Fig. 5 is a perspective view from the front of the rear section of the tree.

Fig. 6 is a detail perspective view of a pivoted foot portion of the tree.

Figure 1:
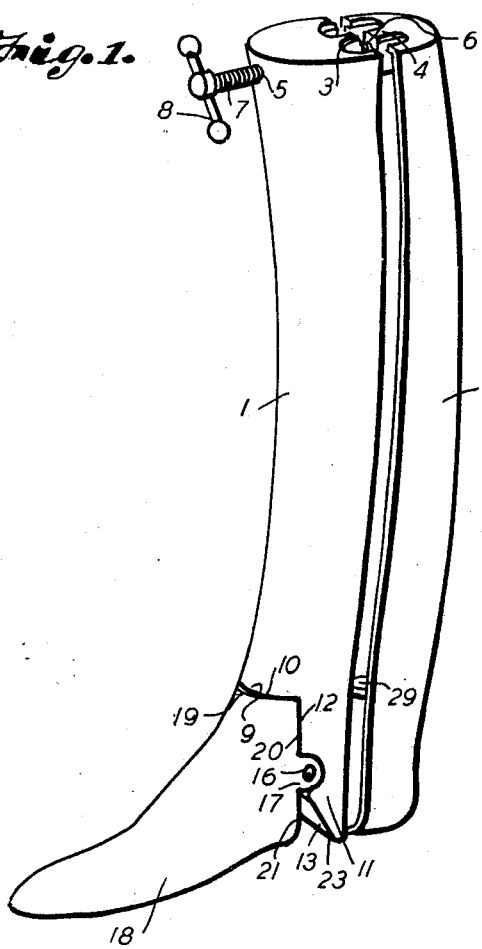
Fig. 1 is a perspective view of a boot tree embodying my invention.
Figure 2:
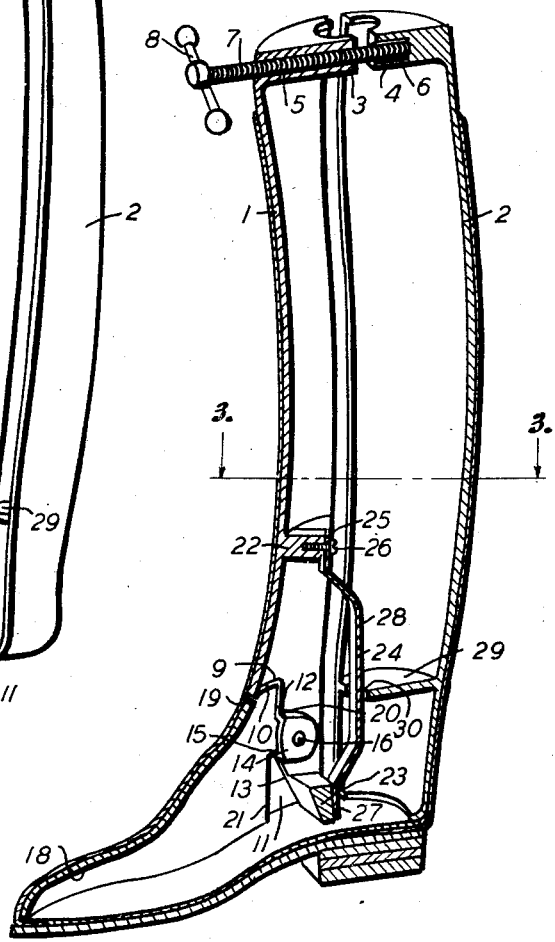
Fig. 2 is a vertical section from front to back through a boot and tree mounted in the boot.
Figure 3:
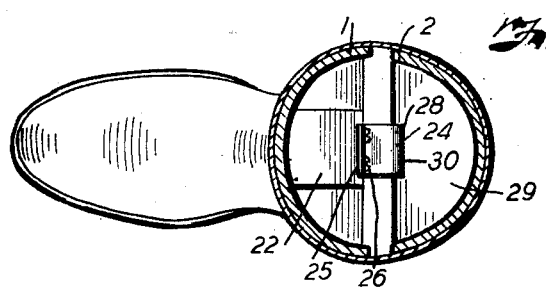
Fig. 3 is a section on the line 3—3, Fig. 2.

Referring in detail to the drawings:

1 and 2 designate respectively front and rear members or shin and calf sections of a boot tree formed preferably of metal and hollow, having outer surfaces conforming substantially to the shape of front and rear portions of the leg of a boot. Bosses 3 and 4 formed in the upper ends of the members are provided respectively with a threaded channel 5 and a socket 6 registering with the channel, and a screw 7 having a handle 8 is mounted in the channel and socket for moving the sections relatively to each other to accommodate the tree to the size and proportions of a boot in which the tree is mounted. The diameter of the socket is sufficiently great to permit the screw to move freely therein, and tilt slightly for a purpose presently disclosed. The lower end of the rear section is closed by a heel.

The front section further includes a lower end portion incut to provide a recess or notch 9 having a transverse edge 10, and downwardly extending tapering flanges or wings 11 having substantially vertical edge portions or shoulders 12 and inclined edge portions 13. Pivoted bearing bosses 14 formed on the inner faces of the wings cover notches 15 formed therein, and are apertured to receive pins 16 mounted in ears 17 on a foot member 18 for pivotally supporting said member.

The upper end portion of the foot member has upper and side edge portions 19 and 20 engageable with the edges 10 and 12 to limit upward pivotal movement of the foot member, and the lower vertical edge portions 21 of the foot member may engage the tapered edges 13 to limit downward pivotal movement of said member.

Fixed to one of the sections, for example the front section as illustrated, and preferably comprising integral members formed in the process of producing the section, is a boss or bracket plate 22 located a substantial distance above the foot member, and a lateral weblike arm or seat 23 projecting transversely of the section and connecting the lower ends of the wings below the pivot bearings. A relatively long leaf spring or fulcrum member 24 has an upper end 25 fixed to the bracket 22 by screws 26 on the median line of the section 1 and a free lower end 27 adapted to engage the rear face of said seat as presently described.

The spring includes a rearwardly offset body portion 28 normally extending a substantial distance outwardly from the section 1 toward the rear section, and a web or plate 29 preferably integral with the rear section is located therein substantially midway between the bracket 22 and seat 23 to engage said spring when the tree is mounted in a boot and the lower ends of the front and rear sections are thus brought together.

A guide notch 30 is preferably formed in the front edge of the web 29 to receive the body of the spring.

In using the device, the toe portion is pivoted and retained in inclined position by the shoulder-like edges of the wings, for mounting the front section of the tree in a boot. The rear section is then mounted in the boot, the web 29 engaging the spring and being guided by the notch to urge the pivoted foot member into the toe of the boot and urge the sections apart to effect a tight fit of the tree in the lower portion of the boot.

The sections are stopped by the inner bottom face of the sole in position to align the channel with the socket in the upper ends of the tree sections, and the screw may then be moved into the socket and the tree adjusted to the boot by operating the screw.

The tree sections may pivot slightly on the pivot formed by the web which engages the spring to permit the upper ends to be spread apart.

What I claim and desire to secure by Letters Patent is:

1. A boot tree comprising front and rear sections, screw means at the upper ends of said sections for spreading said upper ends, a spring fixed to one of said sections adjacent the lower end thereof, and a web mounted in the other section to engage said spring for spreading the lower ends of said sections.

2. A boot tree comprising a front section having an internal boss and a depending flange provided with a transverse arm, a rear section provided with a horizontal internal web provided with a notch, and a spring having one end fixed to said boss extending in registry with said notch and located to engage said arm.

3. A boot tree comprising front and rear sections arranged to be separately mounted in the leg of a boot, a spring fixed to one of the sections and adapted to slidably engage the other section when one section is slid into the boot alongside the other section to spread the lower ends of said sections, and means for spreading the upper ends of the sections to fulcrum one of the sections on the spring.

4. A boot tree comprising shin and calf sections arranged to be separately mounted in a boot, a foot section hinged on the shin section, a yieldably spreading member carried by the lower end of one of the sections to force the foot section into the foot portion of the boot and forming a pivot point for the other section to spread the lower ends of the sections, and means carried at the upper end of one of the sections to spread the upper ends of the sections from said pivotal point.

5. A boot tree comprising a shin section, a calf section provided with a horizontal internal web having a notch, a foot section hinged to the shin section, an arch-shaped spring having its arch portion adapted to engage in said notch and having one end anchored to the shin section and its opposite end engaging against the lower end of the shin section to force the foot section into the foot portion of the boot, and means carried at the upper end of the shin section and engaging the calf section for spreading the sections apart.

In testimony whereof I affix my signature.

FRED R. MAIER.